United States Patent
Wang et al.

(10) Patent No.: US 10,667,200 B2
(45) Date of Patent: May 26, 2020

(54) USER ACCESS METHOD AND USER EQUIPMENT

(71) Applicant: Huawei Technologies Co., Ltd., Shenzhen (CN)

(72) Inventors: Da Wang, Beijing (CN); Jian Wang, Beijing (CN); Bin Liu, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 15/773,515

(22) PCT Filed: Dec. 16, 2015

(86) PCT No.: PCT/CN2015/097597
§ 371 (c)(1),
(2) Date: May 3, 2018

(87) PCT Pub. No.: WO2017/101044
PCT Pub. Date: Jun. 22, 2017

(65) Prior Publication Data
US 2018/0317158 A1 Nov. 1, 2018

(51) Int. Cl.
*H04W 48/08* (2009.01)
*H04W 52/02* (2009.01)
*H04W 76/28* (2018.01)

(52) U.S. Cl.
CPC .......... *H04W 48/08* (2013.01); *H04W 52/02* (2013.01); *H04W 76/28* (2018.02);
(Continued)

(58) Field of Classification Search
None
See application file for complete search history.

(56) References Cited

U.S. PATENT DOCUMENTS

2007/0183361 A1 8/2007 Damnjanovic et al.
2011/0070823 A1 3/2011 Liu et al.
(Continued)

FOREIGN PATENT DOCUMENTS

CN 102143562 A 8/2011
CN 103945497 A 7/2014
(Continued)

OTHER PUBLICATIONS

Foreign Communication From A Counterpart Application, European Application No. 15910517.0, Extended European Search Report dated Aug. 20, 2018, 10 pages.
Machine Translation and Abstract of Chinese Publication No. CN102204392, dated Apr. 1, 2015, 13 pages.
Machine Translation and Abstract of International Publication No. WO2015176251, dated Nov. 26, 2015, 32 pages.
(Continued)

*Primary Examiner* — Chi H Pham
*Assistant Examiner* — Raul Rivas
(74) *Attorney, Agent, or Firm* — Conley Rose, P.C.

(57) ABSTRACT

A user access method and user equipment (UE). A second device communicates with a first device at a predetermined moment in order to access the first device, where the predetermined moment is determined according to a discontinuous reception (DRX) cycle of the first device. In this process, the predetermined moment is determined according to the DRX cycle of the first device, and the second device communicates with the first device at the predetermined moment in order to access the first device such that the second device accesses the first device.

18 Claims, 6 Drawing Sheets

A first device sends predetermined moment information to a second device, where the predetermined moment information includes a predetermined moment determined according to a DRX cycle of the first device — 201

The first device communicates with the second device at the predetermined moment, where the first device is a device that accesses a network side device, and the second device is a device that can access the network side device using the first device — 202

(52) U.S. Cl.
CPC .......... *Y02D 70/1262* (2018.01); *Y02D 70/20* (2018.01); *Y02D 70/21* (2018.01); *Y02D 70/24* (2018.01); *Y02D 70/26* (2018.01)

(56) References Cited

U.S. PATENT DOCUMENTS

| | | | |
|---|---|---|---|
| 2011/0237231 A1* | 9/2011 | Horneman | H04W 52/0216 455/414.1 |
| 2013/0176890 A1 | 7/2013 | Sharma et al. | |
| 2013/0229931 A1 | 9/2013 | Kim | |
| 2015/0282132 A1* | 10/2015 | Kim | H04W 8/005 370/329 |
| 2016/0366645 A1 | 12/2016 | Song et al. | |
| 2017/0142558 A1 | 5/2017 | Xu | |
| 2018/0110060 A1 | 4/2018 | Huang et al. | |

FOREIGN PATENT DOCUMENTS

| | | |
|---|---|---|
| CN | 102204392 B | 4/2015 |
| CN | 104936294 A | 9/2015 |
| GB | 2498750 A | 7/2013 |
| WO | 2015117292 A1 | 8/2015 |
| WO | 2015130076 A1 | 9/2015 |
| WO | 2015176251 A1 | 11/2015 |

OTHER PUBLICATIONS

Foreign Communication From A Counterpart Application, Chinese Application No. 201580080641.5, Chinese Office Action dated Jul. 22, 2019, 8 pages.
Machine Translation and Abstract of Chinese Publication No. CN102143562, dated Aug. 3, 2011, 17 pages.
Machine Translation and Abstract of Chinese Publication No. CN103945497, dated Jul. 23, 2014, 17 pages.
"3rd Generation Partnership Project; Technical Specification Group Radio Access Network; Evolved Universal Terrestrial Radio Access (E-UTRA); Physical channels and modulation (Release 12)," 3GPP TS 36.211, V12.7.0, Sep. 2015, 136 pages.
"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.7.0, Sep. 2015, 77 pages.
Sony, "Smarter Use Case on IoT Wearables—Sports and Fitness," S1-151077, 3GPP TSG-SA WG1 Meeting #70 Apr. 13-17, 2015, 2 pages.
Foreign Communication From A Counterpart Application, PCT Application No. PCT/CN2015/097597, English Translation of International Search Report dated Sep. 19, 2016, 2 pages.

* cited by examiner

USER ACCESS METHOD AND USER EQUIPMENT

CROSS-REFERENCE TO RELATED APPLICATION

This application is a U.S. National Stage of International Patent Application No. PCT/CN2015/097597 filed on Dec. 16, 2015, which is hereby incorporated by reference in its entirety.

TECHNICAL FIELD

Embodiments of the present disclosure relate to communications technologies, and in particular, to a user access method and user equipment (UE).

BACKGROUND

In a device to device (D2D) communication scenario, in addition to accessing a network using a network side device (such as a base station), UE may access the network using another UE. In this process, UE that provides a network access function for another UE is a first device, such as a smartphone or another high-capability device, and UE that accesses the network using the first device is a second device, such as a wearable device (WD) or another low-capability device.

The first device accesses the network in two manners, contention-based random access and non-contention based random access. When the contention-based random access manner is used, the first device first sends a random access channel (RACH) preamble (PRACH) to a base station to notify the base station of a random access request such that the base station estimates a transmission delay between the base station and the first device and correspondingly calibrates uplink timing. Then, the base station sends a random access response (RAR) to the first device. Then, the first device sends information 3 (or message 3 (Msg 3)) to the base station. Finally, the base station sends a contention resolution message to the first device, and the first device accesses the network. When the non-contention based random access manner is used, the last two steps do not need to be performed.

Generally, each first device may connect to a plurality of second devices, and act as a relay to connect the second devices and the network. When the second device needs to upload data to the network, for example, the second device is a WD, and collected health data such as a blood pressure or a heart rate needs to be uploaded to the network, the second device needs to access the first device for data uploading. In addition, when the first device or the network side device pages the second device, and the second device listens and detects paging, the second device needs to access the first device to receive data. Currently, the second device accesses the first device in a manner in which the first device accesses the base station, that is, the contention-based random access manner and the non-contention based random access manner.

However, the second device is a low-capability device, and the random access process is relatively complex. If the second device accesses the first device in the random access manner, power consumption is high, consequently, a working time of the second device is short, and performance of the second device is severely affected.

SUMMARY

Embodiments of the present disclosure provide a user access method and UE such that a second device accesses a first device, and power is reduced.

According to a first aspect, an embodiment of the present disclosure provides a user access method, including receiving, by a second device, predetermined moment information, where the predetermined moment information is sent by a first device or a network device, and the predetermined moment information includes a predetermined moment determined according to a discontinuous reception (DRX) cycle of the first device, and communicating, by the second device, with the first device at the predetermined moment, where the first device is a device that accesses the network side device, and the second device is a device that may access the network side device using the first device.

Optionally, communicating, by the second device, with the first device at the predetermined moment includes sending, by the second device, an access signal to the first device at the predetermined moment.

Optionally, the access signal is an access sequence, the access sequence of the second device is orthogonal to an access sequence of a third device, and the third device is a device that communicates with the first device when the second device communicates with the first device at the predetermined moment.

Optionally, communicating, by the second device, with the first device at the predetermined moment includes sending, by the second device, data to the first device at the predetermined moment.

Optionally, communicating, by the second device, with the first device at the predetermined moment includes receiving, by the second device at the predetermined moment, a signal sent by the first device, where the signal is a signal for permitting the second device to access the first device.

Optionally, communicating, by the second device, with the first device at the predetermined moment includes communicating, by the second device, with the first device according to an access cycle and at the predetermined moment in the access cycle, where the access cycle is N times the DRX cycle, the predetermined moment is an $M^{th}$ subframe, the $M^{th}$ subframe is an $M^{th}$ subframe before or after a paging subframe in a first DRX cycle, $N \geq 1$, $M \geq 1$, N and M are integers, and the first DRX cycle is the $1^{st}$ DRX cycle of the N DRX cycles included in the access cycle.

Optionally, a resource corresponding to the predetermined moment includes a time domain resource and a frequency domain resource, the time domain resource is R symbols included in the $M^{th}$ subframe, $R \geq 1$, the frequency domain resource is S physical resource blocks (PRBs), and $S \geq 1$.

Optionally, the $M^{th}$ subframe is different from a subframe occupied by the first device to send a PRACH.

Optionally, before sending, by the second device, an access signal to the first device at the predetermined moment, the method further includes receiving, by the second device, the access sequence, where the access sequence is configured by the first device or the network side device for the second device.

Optionally, before sending, by the second device, an access signal to the first device at the predetermined moment, the method further includes receiving, by the second device, an access sequence set, where the access sequence set is configured by the first device or the network side device for the second device, and different access sequences included in the access sequence set correspond to different types of data, and determining, by the second device, the access sequence from the sequence set according to a type of transmitted data.

According to a second aspect, an embodiment of the present disclosure provides a user access method, including sending, by a first device, predetermined moment information to a second device, where the predetermined moment information includes a predetermined moment determined according to a DRX cycle of the first device, and communicating, by the first device, with the second device at the predetermined moment, where the first device is a device that accesses a network side device, and the second device is a device that can access the network side device using the first device.

Optionally, communicating, by the first device, with the second device at the predetermined moment includes receiving, by the first device at the predetermined moment, an access signal sent by the first device.

Optionally, the access signal is an access sequence, the access sequence of the second device is orthogonal to an access sequence of a third device, and the third device is a device that communicates with the first device when the second device communicates with the first device at the predetermined moment.

Optionally, communicating, by the first device, with the second device at the predetermined moment includes receiving, by the first device at the predetermined moment, data sent by the second device.

Optionally, communicating, by the first device, with the second device at the predetermined moment includes sending, by the first device, a signal to the second device at the predetermined moment, where the signal is a signal for permitting the second device to access the first device.

Optionally, communicating, by the first device, with the second device at the predetermined moment includes communicating, by the first device, with the second device at the predetermined moment in an access cycle of the second device, where the access cycle is N times the DRX cycle, the predetermined moment is an $M^{th}$ subframe, the $M^{th}$ subframe is an $M^{th}$ subframe before or after a paging subframe in a first DRX cycle, N≥1, M≥1, N and M are integers, and the first DRX cycle is the $1^{st}$ DRX cycle of the N DRX cycles included in the access cycle.

Optionally, a resource corresponding to the predetermined moment includes a time domain resource and a frequency domain resource, the time domain resource is R symbols included in the $M^{th}$ subframe, R≥1, the frequency domain resource is S PRBs, and S≥1.

Optionally, the $M^{th}$ subframe is different from a subframe occupied by the first device to send a PRACH.

Optionally, before receiving, by the first device at the predetermined moment, an access signal sent by the first device, the method further includes configuring and sending, by the first device, the access sequence to the second device.

Optionally, before receiving, by the first device at the predetermined moment, an access signal sent by the first device, the method further includes configuring and sending, by the first device, an access sequence set to the second device, where different access sequences included in the access sequence set correspond to different types of data.

According to a third aspect, an embodiment of the present disclosure provides a device, where the device is a second device, and the second device includes a receiver configured to receive predetermined moment information, where the predetermined moment information is sent by a first device or a network device, and the predetermined moment information includes a predetermined moment determined according to a DRX cycle of the first device, and a processor configured to communicate with the first device at the predetermined moment included in the predetermined moment information received by the receiver, where the first device is a device that accesses the network side device, and the second device is a device that can access the network side device using the first device.

Optionally, the processor is further configured to send an access signal to the first device at the predetermined moment.

Optionally, the access signal is an access sequence, the access sequence of the second device is orthogonal to an access sequence of a third device, and the third device is a device that communicates with the first device when the second device communicates with the first device at the predetermined moment.

Optionally, the processor is further configured to send data to the first device at the predetermined moment.

Optionally, the processor is further configured to receive, at the predetermined moment, a signal sent by the first device, where the signal is a signal for permitting the second device to access the first device.

Optionally, the processor is further configured to communicate with the first device according to an access cycle and at the predetermined moment in the access cycle, where the access cycle is N times the DRX cycle, the predetermined moment is an $M^{th}$ subframe, the $M^{th}$ subframe is an $M^{th}$ subframe before or after a paging subframe in a first DRX cycle, N≥1, M≥1, N and M are integers, and the first DRX cycle is the $1^{st}$ DRX cycle of the N DRX cycles included in the access cycle.

Optionally, a resource corresponding to the predetermined moment includes a time domain resource and a frequency domain resource, the time domain resource is R symbols included in the $M^{th}$ subframe, R≥1, the frequency domain resource is S PRBs, and S≥1.

Optionally, the $M^{th}$ subframe is different from a subframe occupied by the first device to send a PRACH.

Optionally, the receiver is further configured to receive the access sequence before the processor sends the access signal to the first device at the predetermined moment, where the access sequence is configured by the first device or the network side device for the second device.

Optionally, the receiver is further configured to receive an access sequence set before the processor sends the access signal to the first device at the predetermined moment, where the access sequence set is configured by the first device or the network side device for the second device, and different access sequences included in the access sequence set correspond to different types of data, and the processor is further configured to determine the access sequence from the sequence set according to a type of transmitted data.

According to a fourth aspect, an embodiment of the present disclosure provides UE, where the UE is a first device, and the first device includes a transmitter configured to send predetermined moment information to a second device, where the predetermined moment information includes a predetermined moment determined according to a DRX cycle of the first device, and a processor configured to communicate with the second device at the predetermined moment included in the predetermined moment information sent by the transmitter, where the first device is a device that accesses a network side device, and the second device is a device that may access the network side device using the first device.

Optionally, the processor is further configured to receive, at the predetermined moment, an access signal sent by the first device.

Optionally, the access signal is an access sequence, the access sequence of the second device is orthogonal to an access sequence of a third device, and the third device is a device that communicates with the first device when the second device communicates with the first device at the predetermined moment.

Optionally, the processor is further configured to receive, at the predetermined moment, data sent by the second device.

Optionally, the processor is further configured to send a signal to the second device at the predetermined moment, where the signal is a signal for permitting the second device to access the first device.

Optionally, the processor is further configured to communicate with the second device at the predetermined moment in an access cycle of the second device, where the access cycle is N times the DRX cycle, the predetermined moment is an $M^{th}$ subframe, the $M^{th}$ subframe is an $M^{th}$ subframe before or after a paging subframe in a first DRX cycle, N≥1, M≥1, N and M are integers, and the first DRX cycle is the $1^{st}$ DRX cycle of the N DRX cycles included in the access cycle.

Optionally, a resource corresponding to the predetermined moment includes a time domain resource and a frequency domain resource, the time domain resource is R symbols included in the $M^{th}$ subframe, R≥1, the frequency domain resource is S PRBs, and S≥1.

Optionally, the $M^{th}$ subframe is different from a subframe occupied by the first device to send a PRACH.

Optionally, the transmitter is further configured to configure and send the access sequence to the second device before the processor receives, at the predetermined moment, the access signal sent by the first device.

Optionally, the transmitter is configured to configure and send an access sequence set to the second device before the processor receives, at the predetermined moment, the access signal sent by the first device, where different access sequences included in the access sequence set correspond to different types of data.

According to the user access method and the UE provided in the embodiments of the present disclosure, the second device communicates with the first device at the predetermined moment so as to access the first device, where the predetermined moment is determined according to the DRX cycle of the first device. In this process, the predetermined moment is determined according to the DRX cycle of the first device, and the second device communicates with the first device at the predetermined moment so as to access the first device such that the second device accesses the first device. In addition, in this process, when accessing the first device, the second device accesses the first device in a wakeup period of the first device such that the first device does not need to wake up frequently to wait for access from the second device, and power consumption of the first device is reduced. In addition, when there are a plurality of second devices, the plurality of second devices access the first device at the predetermined moment together or in a contention manner such that a network scheduling resource can be saved.

DESCRIPTION OF EMBODIMENTS

In the specification, claims, and accompanying drawings of the present disclosure, the terms "first," "second," "third," "fourth," and so on (if exists) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include," "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

In other approaches, a first device accesses a network side device using an RACH mechanism of Long Term Evolution (LTE). If a second device accesses the first device also using the RACH mechanism, an access process is complex, power consumption is high, and performance of the second device is greatly affected. In addition, the RACH mechanism is a mechanism for accessing the network side device by a large quantity of first devices. However, because a quantity of second devices connected to one first device is not quite large, such as 10 to 20, the RACH mechanism is not required. Furthermore, if the second device uses the RACH mechanism to access the first device, that is, connected UE, during accessing, a conflict is caused to a signal sent by another nearby first device (that is, adjacent UE). In addition, because the first device cannot perform receiving and sending simultaneously due to a half-duplex limitation, access from the second device is unsuccessful. Therefore, a new mechanism for accessing the first device by the second device needs to be designed.

Figures 1, 2:
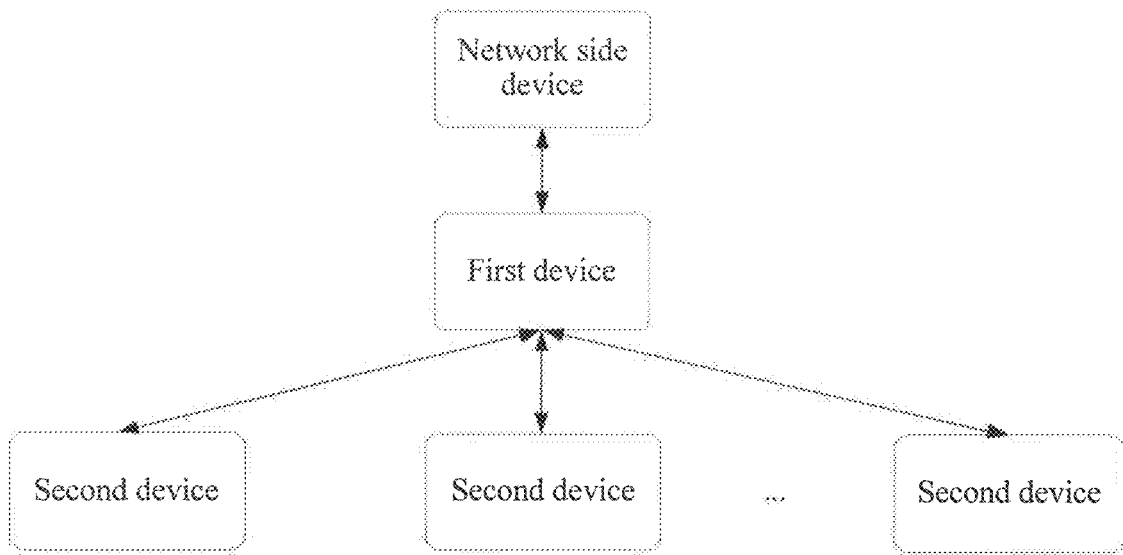
FIG. 1 is a schematic diagram of a network architecture applicable to a user access method according to the present disclosure.
FIG. 2 is a flowchart of Embodiment 1 of a user access method according to the present disclosure.

FIG. 1 is a schematic diagram of a network architecture applicable to a user access method according to the present disclosure. As shown in FIG. 1, in the network architecture, a first device is a device that accesses a network side device, the first device is connected to a plurality of second devices, and the second devices may access the network side device using the first device. The first device is a high-capability device, such as a smartphone, and may be used as a relay node to assist a low-capability device in accessing the network side device, and the second device is a low-capability device, such as a WD. The following describes in detail the user access method according to the present disclosure with reference to FIG. 1.

FIG. 2 is a flowchart of Embodiment 1 of a user access method according to the present disclosure. This embodiment is executed by a second device, and is applicable to a scenario in which the second device needs to access a first device. Further, this embodiment includes the following steps.

Step 101. The second device receives predetermined moment information, where the predetermined moment information is sent by the first device or a network device, and the predetermined moment information includes a predetermined moment determined according to a DRX cycle of the first device.

Step 102. The second device communicates with the first device at the predetermined moment, where the first device is a device that accesses the network side device, and the second device is a device that can access the network side device using the first device.

In this embodiment of the present disclosure, the first device is, for example, UE, the second device is, for example, a WD, and the network side device is, for example, a base station. Generally, after accessing the network side device, if there is no signal transmission, the first device enters a sleep state and periodically wakes up to listen to a signal of the network device, and a period length is a DRX cycle. For example, a value of DRX is 320 milliseconds (ms), 640 ms, 1.28 seconds (s), or 2.56 s.

If the first device frequently wakes up to listen to an access request of the second device, the first device consumes more power. Therefore, to avoid high power consumption caused by frequent wakeup of the first device, the second device may communicate with the first device at the predetermined moment. The predetermined moment may be determined according to the DRX cycle. For example, one predetermined moment is set in every N DRX cycles. The predetermined moment is used for communication between the first device and the second device such that the second device accesses the first device. Therefore, an access cycle of the second device is N times the DRX cycle, and N≥1 and is an integer. A larger N indicates a longer interval at which the first device communicates with the second device and lower power consumption of the first device and the second device, and more system resources are saved.

According to the user access method provided in this embodiment of the present disclosure, the second device communicates with the first device at the predetermined moment so as to access the first device, where the predetermined moment is determined according to the DRX cycle of the first device. In this process, the predetermined moment is determined according to the DRX cycle of the first device, and the second device communicates with the first device at the predetermined moment so as to access the first device such that the second device accesses the first device. In addition, in this process, when accessing the first device, the second device accesses the first device in a wakeup period of the first device such that the first device does not need to wake up frequently to wait for access from the second device, and power consumption of the first device is reduced. In addition, when there are a plurality of second devices, the plurality of second devices access the first device at the predetermined moment together or in a contention manner such that a network scheduling resource can be saved.

Figure 3:
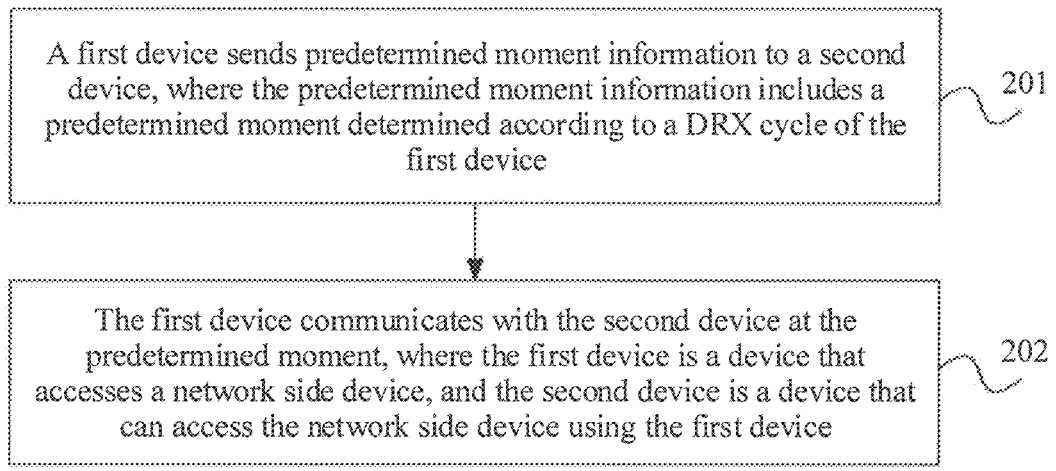
FIG. 3 is a flowchart of Embodiment 2 of a user access method according to the present disclosure.

FIG. 3 is a flowchart of Embodiment 2 of a user access method according to the present disclosure. This embodiment is executed by a first device and is applicable to a scenario in which a second device needs to access the first device. Further, this embodiment includes the following steps.

Step 201. The first device sends predetermined moment information to a second device, where the predetermined moment information includes a predetermined moment determined according to a DRX cycle of the first device.

Step 202. The first device communicates with the second device at the predetermined moment, where the first device is a device that accesses a network side device, and the second device is a device that can access the network side device using the first device.

Further, for descriptions of the first device, the second device, the network side device, the predetermined moment, and the like, refer to descriptions in the embodiment in FIG. 2, and details are not described herein.

According to the user access method provided in this embodiment of the present disclosure, the first device communicates with the second device at the predetermined moment such that the second device accesses the first device, where the predetermined moment is determined according to the DRX cycle of the first device. In this process, the predetermined moment is determined according to the DRX cycle of the first device, and the second device communicates with the first device at the predetermined moment so as to access the first device such that the second device accesses the first device, and power is reduced. In addition, in this process, when accessing the first device, the second device accesses the first device in a wakeup period of the first device such that the first device does not need to wake up frequently to wait for access from the second device, and power consumption of the first device is reduced. In addition, when there are a plurality of second devices, the plurality of second devices access the first device at the predetermined moment together or in a contention manner such that a network scheduling resource can be saved.

In the foregoing embodiments, that the second device communicates with the first device at the predetermined moment is as follows. The second device communicates with the first device according to an access cycle and at the predetermined moment in the access cycle, where the access cycle is N times the DRX cycle, the predetermined moment is an $M^{th}$ subframe, the $M^{th}$ subframe is an $M^{th}$ subframe before or after a paging subframe in a first DRX cycle, N≥1, M≥1, N and M are integers, and the first DRX cycle is the $1^{st}$ DRX cycle of the N DRX cycles included in the access cycle. The following describes in detail the predetermined moment, a resource corresponding to the predetermined moment, and an access manner in which the second device communicates with the first device to access the first device.

Figure 4A:
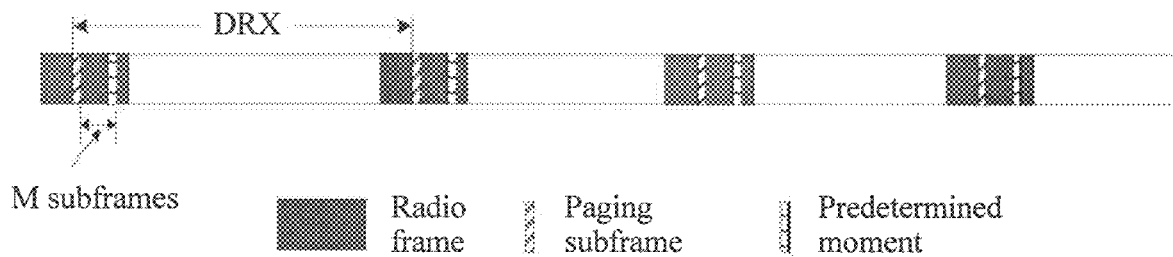
FIG. 4A is a schematic diagram of a predetermined moment in a user access method according to an embodiment of the present disclosure.
Figure 4B:
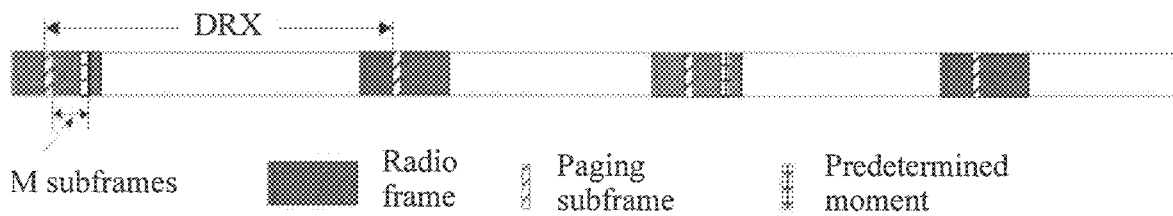
FIG. 4B is a schematic diagram of a predetermined moment in a user access method according to another embodiment of the present disclosure.

The predetermined moment:

Generally, data that needs to be uploaded by the second device is delay-insensitive data, and waiting duration is relatively long, such as greater than 1 s. If a cycle for the second device to access the first device is longer, more power and channel resources can be saved for the first device and the second device. Therefore, in this embodiment of the present disclosure, for example, the access cycle for the second device to access the first device is N times the DRX cycle of the first device, and N≥1. For example, if the DRX cycle of the first device is 320 ms, the access cycle of the second device may be 1.28 s, that is, four times of the DRX cycle of the first device. Further, referring to FIG. 4A and FIG. 4B, FIG. 4A is a schematic diagram of a predetermined moment in a user access method according to an embodiment of the present disclosure, and FIG. 4B is a schematic diagram of a predetermined moment in a user access method according to another embodiment of the present disclosure. A gray filling pattern indicates a radio frame, a slash filling pattern indicates a paging subframe, and a square filling pattern indicates a predetermined moment.

Referring to FIG. 4A, in this embodiment, a length of one access cycle is equal to a first DRX cycle, that is, one access cycle includes one DRX cycle, and a predetermined moment is an $M^{th}$ subframe after a paging moment.

Referring to FIG. 4B, in this embodiment, a length of one access cycle is equal to two DRX cycles, that is, one access cycle includes two DRX cycles, and a predetermined moment is an $M^{th}$ subframe after a paging subframe in the first DRX cycle of the two DRX cycles included in the access cycle.

In this embodiment of the present disclosure, a first device is a half-duplex communication device and cannot simultaneously receive and send a signal. If a subframe occupied by a second device to access the first device at an access moment, that is, the predetermined moment, is a moment at which the first device transmits uplink data, the first device may upload the data at another location. However, if the access moment at which the second device accesses the first device, that is, the predetermined moment, occupies a subframe used by the first device to send a PRACH, the first device cannot send a PRACH signal at this location and has to attempt to access a network side device again at a next PRACH moment, and a delay is relatively long. The PRACH signal is, for example, a preamble. Therefore, in this embodiment of the present disclosure, the $M^{th}$ subframe is different from the subframe occupied by the first device to send the PRACH in order to avoid a delay caused when the first device is unable to send the PRACH signal because the predetermined moment occupies a resource for sending the PRACH signal. Further, referring to Table 1, Table 1 is a PRACH configuration table in a frequency division duplex (FDD) cell to which the user access method according to the present disclosure is applicable.

Referring to Table 1, the last column in the table is subframes that can be occupied by the predetermined moment at which the second device accesses the first device in this embodiment of the present disclosure, and the first several columns are current cell PRACH configurations. The first column is a PRACH configuration index, the second column is a subframe format occupied by the preamble (Preamble Format for LTE FDD), the third column is a system frame number (including an odd frame and an even frame) of LTE FDD, and the fourth column is a subframe number occupied by the preamble. As shown in Table 1, for example, to avoid a conflict between a subframe corresponding to the predetermined moment and a PRACH subframe of the first device, if the PRACH configuration index of the FDD cell is 0 (that is, configuration for prach-Configuration Index=0), the subframe occupied by the PRACH is a first subframe of an even frame. Therefore, a subframe of an access moment of the second device, that is, the predetermined moment, may be a zeroth, a second, a third, a fourth, a fifth, a sixth, a seventh, an eighth, or a ninth subframe in the even frame or any subframe in an odd frame. For another example, if an FDD cell configuration PRACH-Configuration Index=14, when no available subframe can be used as a subframe corresponding to the predetermined moment at which the second device accesses the first device, a subframe X may be configured for the second device, and subsequently, the second device cannot use the subframe X to send a PRACH signal. Further, to select which subframe or subframes for the second device to access the first device is not limited in the present disclosure.

TABLE 1

| PRACH Configuration Index | Preamble Format for LTE FDD | System Frame Number for LTE FDD | Subframe Number for LTE FDD | Available Subframe Number for WD |
|---|---|---|---|---|
| 0 | 0 (occupying one subframe) | Even | 1 | 0, 2, 3, 4, 5, 6, 7, 8, 9 for even number frame Any Subframe number for odd number frame |
| 1 | 0 | Even | 4 | 0, 1, 2, 3, 5, 6, 7, 8, 9 for even number frame Any Subframe number for odd number frame |
| 2 | 0 | Even | 7 | 0, 1, 2, 3, 4, 5, 6, 8, 9 for even number frame Any Subframe number for odd number frame |
| 3 | 0 | Any | 1 | 0, 2, 3, 4, 5, 6, 7, 8, 9 |
| 4 | 0 | Any | 4 | 0, 1, 2, 3, 5, 6, 7, 8, 9 |
| 5 | 0 | Any | 7 | 0, 1, 2, 3, 4, 5, 6, 8, 9 |
| 6 | 0 | Any | 1, 6 | 0, 2, 3, 4, 5, 7, 8, 9 |
| 7 | 0 | Any | 2, 7 | 0, 1, 3, 4, 5, 6, 8, 9 |
| 8 | 0 | Any | 3, 8 | 0, 1, 2, 4, 5, 6, 7, 9 |
| 9 | 0 | Any | 1, 4, 7 | 0, 2, 3, 5, 6, 8, 9 |
| 10 | 0 | Any | 2, 5, 8 | 0, 1, 3, 4, 6, 7, 9 |

TABLE 1-continued

| PRACH Configuration Index | Preamble Format for LTE FDD | System Frame Number for LTE FDD | Subframe Number for LTE FDD | Available Subframe Number for WD |
|---|---|---|---|---|
| 11 | 0 | Any | 3, 6, 9 | 0, 1, 2, 4, 5, 7, 8 |
| 12 | 0 | Any | 0, 2, 4, 6, 8 | 1, 3, 5, 7, 9 |
| 13 | 0 | Any | 1, 3, 5, 7, 9 | 0, 2, 4, 6, 8 |
| 14 | 0 | Any | 0, 1, 2, 3, 4, 5, 6, 7, 8, 9 | X |
| 15 | 0 | Even | 9 | 0, 1, 2, 3, 4, 5, 6, 7, 8 for even number frame Any Subframe number for odd number frame |
| 16 | 1 (occupying two subframes, occupying two subframes after the subframes are numbered, the same below) | Even | 1 | 0, 3, 4, 5, 6, 7, 8, 9 for even number frame Any Subframe number for odd number frame |
| 17 | 1 | Even | 4 | 0, 1, 2, 3, 6, 7, 8, 9 for even number frame Any Subframe number for odd number frame |
| 18 | 1 | Even | 7 | 0, 1, 2, 3, 4, 5, 6, 9 for even number frame Any Subframe number for odd number frame |
| 19 | 1 | Any | 1 | 0, 3, 4, 5, 6, 7, 8, 9 |
| 20 | 1 | Any | 4 | 0, 1, 2, 3, 6, 7, 8, 9 |
| 21 | 1 | Any | 7 | 0, 1, 2, 3, 4, 5, 6, 9 |
| 22 | 1 | Any | 1, 6 | 0, 3, 4, 5, 8, 9 |
| 23 | 1 | Any | 2, 7 | 0, 1, 4, 5, 6, 9 |
| 24 | 1 | Any | 3, 8 | 0, 1, 2, 5, 6, 7 |
| 25 | 1 | Any | 1, 4, 7 | 0, 3, 6, 9 |
| 26 | 1 | Any | 2, 5, 8 | 0, 1, 4, 7 |
| 27 | 1 | Any | 3, 6, 9 | 1, 2, 5, 8 |
| 28 | 1 | Any | 0, 2, 4, 6, 8 | X |
| 29 | 1 | Any | 1, 3, 5, 7, 9 | X |
| 30 | N/A (indicating no such an option) | N/A | N/A | N/A |
| 31 | 1 | Even | 9 | 1, 2, 3, 4, 5, 6, 7, 8 for even number frame Any Subframe number for odd number frame |
| 32 | 2 (occupying two subframes) | Even | 1 | 0, 3, 4, 5, 6, 7, 8, 9 for even number frame Any Subframe number for odd number frame |
| 33 | 2 | Even | 4 | 0, 1, 2, 3, 6, 7, 8, 9 for even number frame Any Subframe number for odd number frame |
| 34 | 2 | Even | 7 | 0, 1, 2, 3, 4, 5, 6, 9 for even number frame Any Subframe number for odd number frame |
| 35 | 2 | Any | 1 | 0, 3, 4, 5, 6, 7, 8, 9 |
| 36 | 2 | Any | 4 | 0, 1, 2, 3, 6, 7, 8, 9 |
| 37 | 2 | Any | 7 | 0, 1, 2, 3, 4, 5, 6, 9 |
| 38 | 2 | Any | 1, 6 | 0, 3, 4, 5, 8, 9 |
| 39 | 2 | Any | 2, 7 | 0, 1, 4, 5, 6, 9 |
| 40 | 2 | Any | 3, 8 | 0, 1, 2, 5, 6, 7 |
| 41 | 2 | Any | 1, 4, 7 | 0, 3, 6, 9 |
| 42 | 2 | Any | 2, 5, 8 | 0, 1, 4, 7 |
| 43 | 2 | Any | 3, 6, 9 | 1, 2, 5, 8 |
| 44 | 2 | Any | 0, 2, 4, 6, 8 | X |
| 45 | 2 | Any | 1, 3, 5, 7, 9 | X |
| 46 | N/A | N/A | N/A | N/A |
| 47 | 2 | Even | 9 | 1, 2, 3, 4, 5, 6, 7, 8 for even number frame |

TABLE 1-continued

| PRACH Configuration Index | Preamble Format for LTE FDD | System Frame Number for LTE FDD | Subframe Number for LTE FDD | Available Subframe Number for WD |
|---|---|---|---|---|
| 48 | 3 (occupying three subframes) | Even | 1 | Any Subframe number for odd number frame<br>0, 4, 5, 6, 7, 8, 9 for even number frame |
| 49 | 3 | Even | 4 | Any Subframe number for odd number frame<br>0, 1, 2, 3, 7, 8, 9 for even number frame |
| 50 | 3 | Even | 7 | Any Subframe number for odd number frame<br>0, 1, 2, 3, 4, 5, 6 for even number frame |
| 51 | 3 | Any | 1 | 0, 4, 5, 6, 7, 8, 9 |
| 52 | 3 | Any | 4 | 0, 1, 2, 3, 7, 8, 9 |
| 53 | 3 | Any | 7 | 0, 1, 2, 3, 4, 5, 6 |
| 54 | 3 | Any | 1, 6 | 0, 4, 5, 9 |
| 55 | 3 | Any | 2, 7 | 0, 1, 5, 6 |
| 56 | 3 | Any | 3, 8 | 1, 2, 6, 7 |
| 57 | 3 | Any | 1, 4, 7 | 0 |
| 58 | 3 | Any | 2, 5, 8 | 1 |
| 59 | 3 | Any | 3, 6, 9 | 2 |
| 60 | N/A | N/A | N/A | N/A |
| 61 | N/A | N/A | N/A | N/A |
| 62 | N/A | N/A | N/A | N/A |
| 63 | 3 | Even | 9 | 2, 3, 4, 5, 6, 7, 8 for even number frame<br>Any Subframe number for odd number frame |

The resource corresponding to the predetermined moment:

Further, the resource corresponding to the predetermined moment includes a time domain resource and a frequency domain resource, the time domain resource is R symbols included in the $M^{th}$ subframe, $R \geq 1$, the frequency domain resource is S PRBs, and $S \geq 1$.

In terms of the time domain resource, for example, when R=1, for a normal cyclic prefix (NCP) subframe that includes 14 (1 to 14) symbols, one symbol may be selected from the 14 symbols as the time domain resource corresponding to the predetermined moment, for an extended cyclic prefix (ECP) subframe that includes 12 (1 to 12) symbols, one symbol may be selected from the 12 symbols as the time domain resource corresponding to the predetermined moment.

Figure 5:
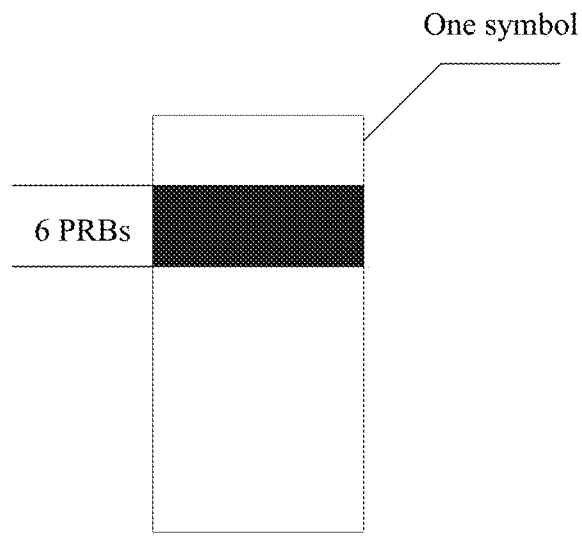
FIG. 5 is a schematic diagram of a location of a PRB in a user access method according to the present disclosure.

In terms of the frequency domain resource, locations of the S PRBs depend on a preset identity (ID), such as an ID of a paired first device. Because IDs of different first devices are different, locations that are of S PRBs and that are determined according to the IDs are different such that frequency domain resources used by the second device to access different first devices are different. Therefore, a resource occupation conflict between different first devices may be reduced when the second device accesses the different first devices. If a total quantity of PRBs in a link between the second device and the first device is T, a start location of the S PRBs is $n_{PRB}^{WD} = S \times mod(UE\_ID, floor(T/S))$, where floor represents "rounding down," or $n_{PRB}^{WD} = S \times mod(UE\_ID, Ceiling(T/S))$, where "ceiling" represents rounding up, or $n_{PRB}^{WD} = S \times mod(UE\_ID, around(T/S))$, where "around" represents rounding off. According to the foregoing descriptions, all second devices that are paired with a same first device send an access sequence on a same resource. For example, when S=6, locations of the six PRBs are shown in FIG. 5. FIG. 5 is a schematic diagram of a location of a PRB in a user access method according to the present disclosure. Referring to FIG. 5, an entire rectangle represents one symbol, and a gray filling part represents the locations of the six PRBs.

Next, an example in which the predetermined moment occupies a sixth symbol on the time domain resource is used to describe impact on subframe sending of the first device.

Figure 6:
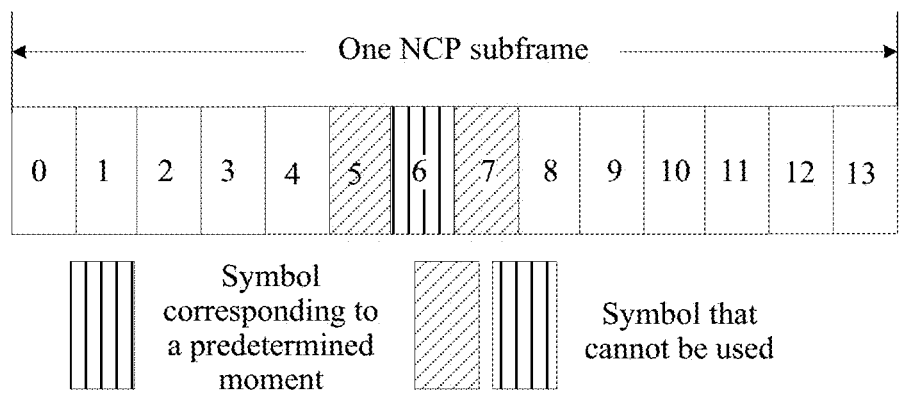
FIG. 6 is a schematic diagram of symbol occupation of an access moment in a user access method according to the present disclosure.

Further, for a first device that matches the second device, in an NCP subframe, due to a half-duplex communication limit of the first device, the first device cannot transmit other data on the sixth symbol. In addition, the first device needs one symbol to switch transmission and receiving. Therefore, three symbols cannot be used to send data, that is, fifth, sixth, and seventh symbols. Further, referring to FIG. 6, FIG. 6 is a schematic diagram of symbol occupation of an access moment in a user access method according to the present disclosure. As shown in FIG. 6, a vertical line filling symbol is a time domain resource occupied by the predetermined moment, that is, the sixth symbol, and a slash filling symbol is a symbol required for receiving and sending switching, that is, the fifth and the seventh symbols. It can be learned that the fifth, the sixth, and the seventh symbols cannot be used to send data.

Figure 7A:
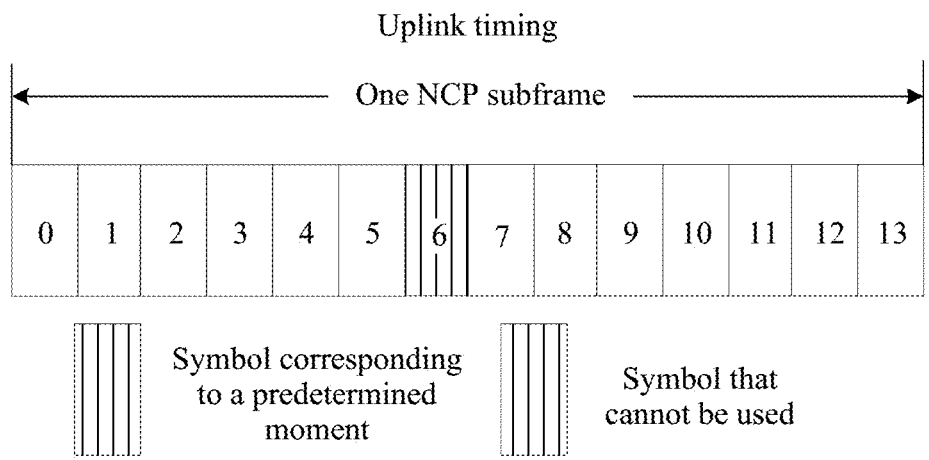
FIG. 7A is a schematic diagram of symbol occupation of an access moment when uplink timing is used in a user access method according to the present disclosure.
Figure 7B:
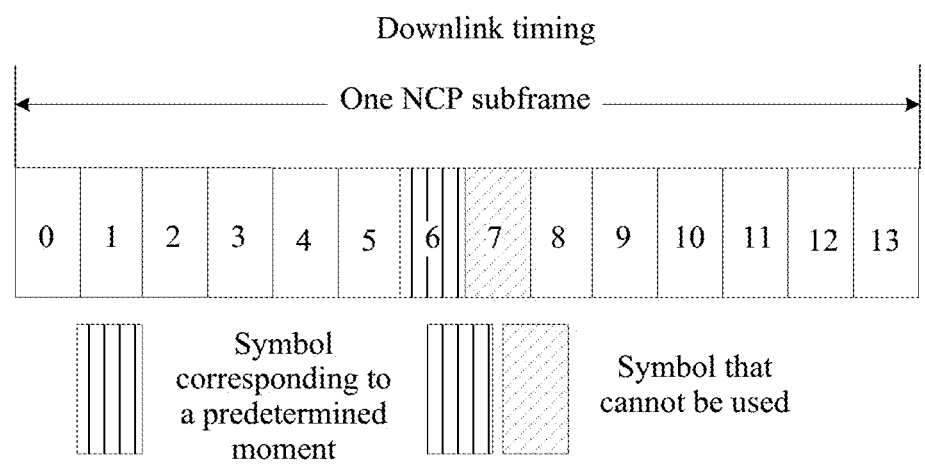
FIG. 7B is a schematic diagram of symbol occupation of an access moment when downlink timing is used in a user access method according to the present disclosure.

An adjacent first device needs to avoid causing interference to the first device that is paired with the second device, and cannot transmit other data at the predetermined moment, that is, on the sixth symbol. If the second device uses uplink timing of an uplink resource, only the sixth symbol cannot be used. Further, referring to FIG. 7A, FIG. 7A is a schematic diagram of symbol occupation of an access moment when uplink timing is used in a user access method according to the present disclosure. If the second device uses downlink timing of a downlink resource, two symbols, that is, the sixth symbol and the seventh symbol, cannot be used. Further, referring to FIG. 7B, FIG. 7B is a schematic diagram of symbol occupation of an access moment when downlink timing is used in a user access method according to the present disclosure. If the second device uses another resource, such as an unlicensed spectrum, the adjacent first device is not affected.

It can be learned from the foregoing that for the first device that is paired with the second device, it is assumed that three symbols cannot be used in each access cycle, and the access cycle is 1.28 ms. For the NCP, a system resource load is $$L_{NCP} = \frac{3}{14 \times 1280} = 0.017\%,$$

for the ECP, a system resource load is $$L_{ECP} = \frac{3}{12 \times 1280} = 0.02\%.$$

An example in which a second device A accesses a first device A, a second device B accesses a first device B, and the first device A and the first device B are adjacent first devices is used below to describe in detail impact brought in a user access process in the present disclosure. Further, there are two cases shown in FIG. 8A and FIG. 8B.

Case 1: The second device A and the second device B simultaneously gain access.

Figure 8A:
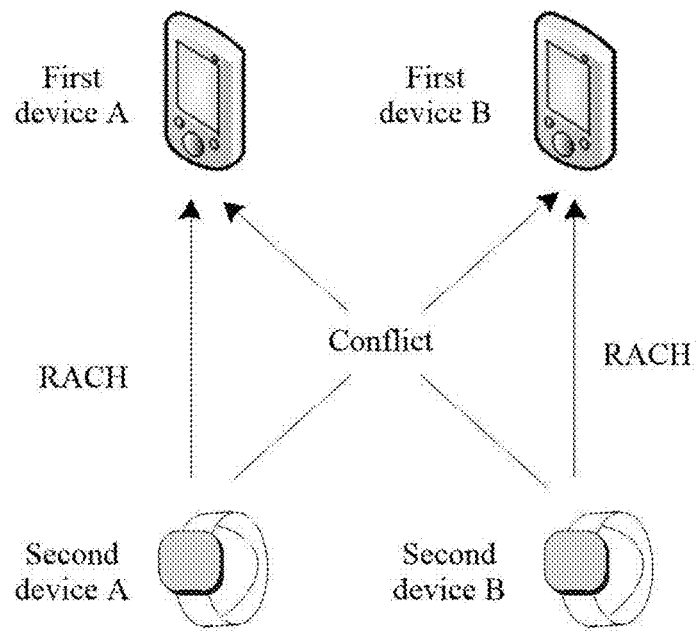
FIG. 8A is a schematic diagram of a scenario in which second devices simultaneously gain access in a user access method according to the present disclosure.

FIG. 8A is a schematic diagram of a scenario in which second devices simultaneously gain access in a user access method according to the present disclosure. In this case, the first device A and the first device B simultaneously detect access sequences of the second device A and the second device B. In this case, that the second device accesses the first device is not affected.

Figure 8B:
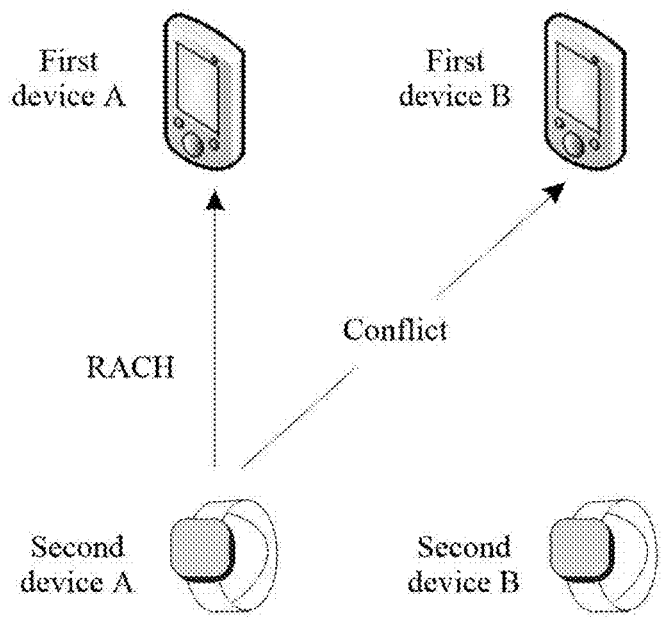
FIG. 8B is a schematic diagram of a scenario in which second devices do not simultaneously gain access in a user access method according to the present disclosure.

Case 2: The second device A accesses the first device A, the second device B does not access the first device B, and vice versa. Further, referring to FIG. 8B, FIG. 8B is a schematic diagram of a scenario in which second devices do not simultaneously gain access in a user access method according to the present disclosure.

In this case, the first device A detects an access sequence of the second device A. Therefore, access from the second device A is not affected. However, the first device B also detects the access sequence of the second device A and feeds back a response message. At this time, the second device B is in a sleep state and does not receive the response message. Therefore, the first device B does not obtain any data of the second device B when a waiting time exceeds preset duration.

The access manner:

Further, the second device may access the first device at the predetermined moment in the following several manners.

Manner 1: The second device sends an access signal to the first device at the predetermined moment. Correspondingly, the first device receives, at the predetermined moment, the access signal sent by the first device.

In this manner, for example, the access signal is an access sequence or data.

Manner 2: The second device sends data to the first device at the predetermined moment. Correspondingly, the first device receives, at the predetermined moment, the data sent by the second device.

Manner 3: The second device receives, at the predetermined moment, a signal sent by the first device, where the signal is a signal for permitting the second device to access the first device and may carry transmission resource indication information. Correspondingly, the first device sends the signal to the first device at the predetermined moment, where the signal is a signal for permitting the second device to access the first device.

The foregoing manners are described in detail below.

In Manner 1, the second device sends the access signal to the first device at the predetermined moment, to notify the first device that the second device requests to access the first device such that the first device or a network side device configures a transmission resource for the second. When the access signal includes an access sequence, the access sequence of the second device is orthogonal to an access sequence of a third device, and the third device is a device that communicates with the first device when the second device communicates with the first device at the predetermined moment. That is, access sequences of the second device and the third device that simultaneously communicate with the first device at the predetermined moment are orthogonal, and the orthogonal access sequences may be sent in a superposition manner such that a plurality of devices can simultaneously communicate with the first device at the predetermined moment, and after receiving the orthogonal access sequences, a terminal can know devices that request to access the terminal. Further, in a process of initially pairing the second device with the first device, the network device may configure a dedicated sequence for the second device, that is, the access sequence, and simultaneously configure the access sequence for the first device. Alternatively, the network side device configures a plurality of access sequences for the first device, the first device stores a correspondence between second devices and the access sequences, and the first device configures a dedicated access sequence for the second device. These access sequences are orthogonal to each other. When receiving a plurality of access sequences, the first device can know second devices that request to access the first device. In this process, the first device configures and sends the access sequence to the second device, correspondingly, the second device receives the access sequence. In addition, the first device may also configure and send an access sequence set to the second device, and different access sequences included in the access sequence set correspond to different types of data. Correspondingly, the second device receives the access sequence set and determines the access sequence from the access sequence set according to a type of transmitted data. For example, the type of the data is a size of the data. Further, each second device may have a plurality of dedicated sequences, such as Q dedicated sequences, where Q≥1. Different sequences represent sizes of data sent by the second device, and different access sequences sent by the second device represent sizes of data to be sent by the second device. After receiving the access sequence, the first device may determine the size of the data to be sent by the second device, and configures a transmission resource for the second device according to the size.

In addition, when one first device is connected to a plurality of second devices, the second devices may send access sequences on a same time-frequency resource so as to save a network resource. In this case, to ensure that the second devices do not interfere with each other, the access sequences of the second devices need to be orthogonal to each other. Therefore, when the first device is initially paired with the second device and allocating sequences, the network side device needs to ensure orthogonality of the allocated sequences. In addition, when the first device is in a different area, a resource used by the second device to access the first device may be reused in order to further save a network resource.

Figure 9:
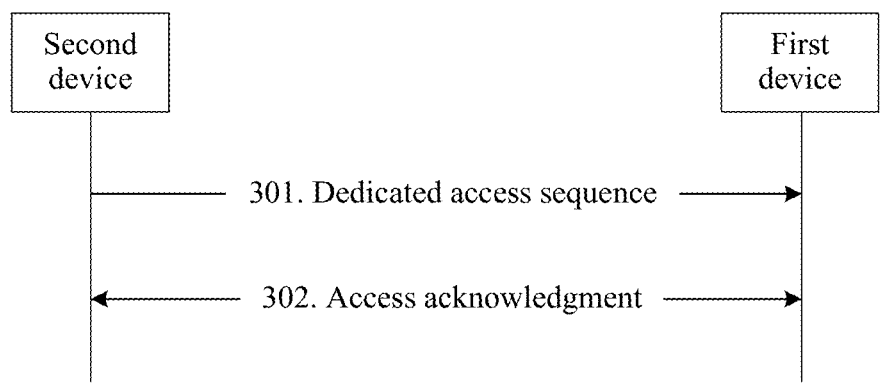
FIG. 9 is a signaling diagram of Manner 1 in an embodiment of a user access method according to the present disclosure.

On the basis of the foregoing descriptions, in this manner, refer to FIG. 9 for a process in which a second device accesses a first device. FIG. 9 is a signaling diagram of Manner 1 in an embodiment of a user access method according to the present disclosure. Referring to FIG. 9, this embodiment includes the following steps.

Step 301. The second device sends a dedicated access sequence to the first device.

In this step, the second device sends the access sequence to the first device at a predetermined moment.

Step 302. The first device sends an access acknowledgment (ACK) to the second device.

The access ACK includes an ID and/or a resource identifier of the second device. The resource identifier is used to indicate a transmission resource such that the second device sends data on the transmission resource.

In this step, if a plurality of second devices simultaneously accesses the first device, the first device replies to all the second devices with one access ACK. In this case, the access ACK includes IDs of the second devices and resource identifiers corresponding to respective transmission resources used by the second devices to send data. The ID of the second device may be a relative ID number, such as 1, 2, 3, . . . , allocated by the first device when the second device is paired with the first device, or may be an international mobile subscriber ID (IMSI), a temporary mobile subscriber ID (TMSI), or the like of the second device.

In addition, in this step, the first device may send the access ACK in a sending window. For example, the sending window is P subframes or frames after step 301, where P≥1. In this case, the second device needs to wait for P subframes or frames after sending its access sequence. If the second device does not receive the access ACK of the first device after waiting for P subframes or frames, it indicates that the second device does not access the first device and resends the access sequence at a next access moment.

Before step 301, that is, before the second device sends the access sequence to the first device at the predetermined moment, the first device configures and sends the access sequence to the second device, correspondingly, the second device receives the access sequence.

In Manner 2, the second device sends data to the first device using a previously reserved transmission resource.

Further, the transmission resource may be configured when the network side device initially pairs the first device with the second device, and a moment for configuring the transmission resource is related to DRX. When the second device does not need to transmit data, the transmission resource is not used for transmission. In this case, the transmission resource may be used by another second device or may be idle. The first device wakes up in the configured transmission resource to receive the data of the second device. In this process, if the first device does not receive the data, it may be caused by the following two reasons. First, the second device does not send data. Second, the first device does not successfully receive data sent by the second device due to interference or the like. In this case, if not receiving an ACK sent by the first device, the second device resends the message in a next cycle of the configured transmission resource.

In Manner 3, the first device sends a signal at the predetermined moment such that the second device accesses the first device.

Further, the first device sends the signal to the second device at the predetermined moment, and the signal carries transmission resource indication information, correspondingly, the second device receives the signal. If the second device needs to transmit data, the data is sent on a corresponding resource according to an indication of the transmission resource indication information. If no data needs to be sent, the signal is not responded. In this process, the signal may be scrambled using an ID of the first device in order to distinguish signals sent by different first devices. In addition, in this process, if the signal sent by the first device conflicts with a signal of another first device, the second device receives the signal at a next predetermined moment. The first device wakes up in the configured transmission resource to receive the data sent by the second device. Same as Manner 2, if the first device does not receive the data, it may be caused by the following two reasons. First, the second device does not send the data. Second, the first device does not successfully receive the data sent by the second device due to interference or the like. In this case, if not receiving an ACK sent by the first device, the second device resends the message in a next cycle of the configured transmission resource.

Figure 10:
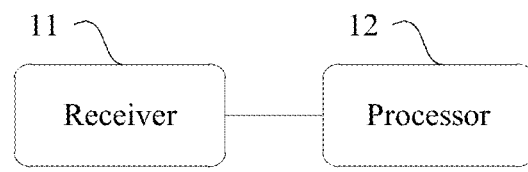
FIG. 10 is a schematic structural diagram of Embodiment 1 of a second device according to the present disclosure.

FIG. 10 is a schematic structural diagram of Embodiment 1 of a second device according to the present disclosure. The second device provided in this embodiment is an apparatus embodiment corresponding to the embodiment in FIG. 2 of the present disclosure, and a specific implementation process is not described herein. Further, the second device provided in this embodiment includes a receiver 11 configured to receive predetermined moment information, where the predetermined moment information is sent by a first device or a network device, and the predetermined moment information includes a predetermined moment determined according to a DRX cycle of the first device, and a processor 12 configured to communicate with the first device at the predetermined moment included in the predetermined moment information received by the receiver 11, where the first device is a device that accesses the network side device, and the second device is a device that can access the network side device using the first device.

According to the second device provided in this embodiment of the present disclosure, the second device communicates with the first device at the predetermined moment so as to access the first device, where the predetermined moment is determined according to the DRX cycle of the first device. In this process, the predetermined moment is determined according to the DRX cycle of the first device, and the second device communicates with the first device at the predetermined moment so as to access the first device such that the second device accesses the first device. In addition, in this process, when accessing the first device, the second device accesses the first device in a wakeup period of the first device such that the first device does not need to wake up frequently to wait for access from the second device, and power consumption of the first device is reduced. In addition, when there is a plurality of second devices, the plurality of second devices access the first device at the predetermined moment together or in a contention manner such that a network scheduling resource can be saved.

Optionally, in an embodiment of the present disclosure, the processor 12 is further configured to send an access signal to the first device at the predetermined moment.

Optionally, in an embodiment of the present disclosure, the access signal is an access sequence, the access sequence of the second device is orthogonal to an access sequence of a third device, and the third device is a device that communicates with the first device when the second device communicates with the first device at the predetermined moment.

Optionally, in an embodiment of the present disclosure, the processor 12 is further configured to send data to the first device at the predetermined moment.

Optionally, in an embodiment of the present disclosure, the processor 12 is further configured to receive, at the predetermined moment, a signal sent by the first device, where the signal is a signal for permitting the second device to access the first device.

Optionally, in an embodiment of the present disclosure, the processor 12 is further configured to communicate with the first device according to an access cycle and at the predetermined moment in the access cycle, where the access cycle is N times the DRX cycle, the predetermined moment is an $M^{th}$ subframe, the $M^{th}$ subframe is an $M^{th}$ subframe before or after a paging subframe in a first DRX cycle, $N \geq 1$, $M \geq 1$, N and M are integers, and the first DRX cycle is the $1^{st}$ DRX cycle of the N DRX cycles included in the access cycle.

Optionally, in an embodiment of the present disclosure, a resource corresponding to the predetermined moment includes a time domain resource and a frequency domain resource, the time domain resource is R symbols included in the $M^{th}$ subframe, $R \geq 1$, the frequency domain resource is S PRBs, and $S \geq 1$.

Optionally, in an embodiment of the present disclosure, the $M^{th}$ subframe is different from a subframe occupied by the first device to send a PRACH.

Optionally, in an embodiment of the present disclosure, the receiver 11 is further configured to receive the access sequence before the processor 12 sends the access signal to the first device at the predetermined moment, where the access sequence is configured by the first device or the network side device for the second device.

Optionally, in an embodiment of the present disclosure, the receiver 11 is further configured to receive an access sequence set before the processor 12 sends the access signal to the first device at the predetermined moment, where the access sequence set is configured by the first device or the network side device for the second device, and different access sequences included in the access sequence set correspond to different types of data, and the processor 12 is further configured to determine the access sequence from the sequence set according to a type of transmitted data.

Figure 11:
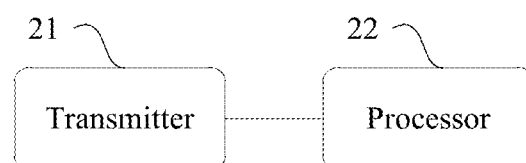
FIG. 11 is a schematic structural diagram of Embodiment 1 of a first device according to the present disclosure.

FIG. 11 is a schematic structural diagram of Embodiment 1 of a first device according to the present disclosure. The first device provided in this embodiment is an apparatus embodiment corresponding to the embodiment in FIG. 3 of the present disclosure, and a specific implementation process is not described herein. Further, the first device provided in this embodiment includes a transmitter 21 configured to send predetermined moment information to a second device, where the predetermined moment information includes a predetermined moment determined according to a DRX cycle of the first device, and a processor 22 configured to communicate with the second device at the predetermined moment included in the predetermined moment information sent by the transmitter 21, where the first device is a device that accesses a network side device, and the second device is a device that can access the network side device using the first device.

According to the first device provided in this embodiment of the present disclosure, the first device communicates with the second device at the predetermined moment such that the second device accesses the first device, where the predetermined moment is determined according to the DRX cycle of the first device. In this process, the predetermined moment is determined according to the DRX cycle of the first device, and the second device communicates with the first device at the predetermined moment so as to access the first device such that the second device accesses the first device and power is reduced. In addition, in this process, when accessing the first device, the second device accesses the first device in a wakeup period of the first device such that the first device does not need to wake up frequently to wait for access from the second device, and power consumption of the first device is reduced. In addition, when there is a plurality of second devices, the plurality of second devices access the first device at the predetermined moment together or in a contention manner such that a network scheduling resource can be saved.

Optionally, in an embodiment of the present disclosure, the processor 22 is further configured to receive, at the predetermined moment, an access signal sent by the second device.

Optionally, in an embodiment of the present disclosure, the access signal is an access sequence, the access sequence of the second device is orthogonal to an access sequence of a third device, and the third device is a device that communicates with the first device when the second device communicates with the first device at the predetermined moment.

Optionally, in an embodiment of the present disclosure, the processor 22 is further configured to receive, at the predetermined moment, data sent by the second device.

Optionally, in an embodiment of the present disclosure, the processor 22 is further configured to send a signal to the second device at the predetermined moment, where the signal is a signal for permitting the second device to access the first device.

Optionally, in an embodiment of the present disclosure, the processor 22 is further configured to communicate with the second device at the predetermined moment in an access cycle of the second device, where the access cycle is N times the DRX cycle, the predetermined moment is an $M^{th}$ subframe, the $M^{th}$ subframe is an $M^{th}$ subframe before or after a paging subframe in a first DRX cycle, $N \geq 1$, $M \geq 1$, N and M are integers, and the first DRX cycle is the $1^{st}$ DRX cycle of the N DRX cycles included in the access cycle.

Optionally, in an embodiment of the present disclosure, a resource corresponding to the predetermined moment includes a time domain resource and a frequency domain resource, the time domain resource is R symbols included in the $M^{th}$ subframe, $R \geq 1$, the frequency domain resource is S PRBs, and $S \geq 1$.

Optionally, in an embodiment of the present disclosure, the $M^{th}$ subframe is different from a subframe occupied by the first device to send a PRACH.

Optionally, in an embodiment of the present disclosure, the transmitter 21 is further configured to configure and send the access sequence to the second device before the processor 22 receives, at the predetermined moment, the access signal sent by the second device.

Optionally, in an embodiment of the present disclosure, the transmitter 21 is configured to configure and send an access sequence set to the second device before the processor 22 receives, at the predetermined moment, the access signal sent by the second device, where different access sequences included in the access sequence set correspond to different types of data.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A second device, comprising:
    a receiver configured to receive predetermined moment information from a first device, wherein the predetermined moment information comprises a predetermined moment determined according to a discontinuous reception (DRX) cycle of the first device;
    a processor coupled to the receiver and configured to communicate with the first device according to an access cycle of the second device and at the predetermined moment comprised in the predetermined moment information,
    wherein the first device is a device that accesses a network side device directly, and wherein the second device is a device that accesses the network side device using the first device and cannot access the network side device directly; and
    wherein the processor is further configured to communicate with the first device according to an access cycle and at the predetermined moment in the access cycle,
    wherein the access cycle comprises N times the DRX cycle, wherein the predetermined moment comprises an $M^h$ subframe, wherein the $M^h$ subframe is an $Mt^h$ subframe before or after a paging subframe in a first DRX cycle, and
    wherein N>1, wherein M>1, wherein N and M are integers, and wherein the first DRX cycle comprises the first DRX cycle of the N DRX cycles comprised in the access cycle.

2. The second device of claim 1, wherein the processor is further configured to send an access signal to the first device at the predetermined moment.

3. The second device of claim 2, wherein the access signal comprises an access sequence, wherein an access sequence of the second device is orthogonal to an access sequence of a third device, and wherein the third device communicates with the first device in a non-contention manner at a same time when the second device communicates with the first device at the predetermined moment.

4. The second device of claim 1, wherein the processor is further configured to send data to the first device at the predetermined moment, and wherein the data sent to the first device prompts the second device to send the data to the network side device on behalf of the first device.

5. The second device of claim 1, wherein the receiver is further configured to receive, at the predetermined moment, a signal from the first device permitting the second device to access the first device, wherein the second device comprises a first radio that only communicates with the first device, and wherein the first device comprises a second radio that communicates with both the second device and the network side device.

6. The second device of claim 1, wherein a resource corresponding to the predetermined moment comprises a time domain resource and a frequency domain resource, wherein the time domain resource is R symbols comprised in the $M''^h$ subframe, wherein R>1, wherein the frequency domain resource comprises S physical resource blocks (PRBs), and wherein S>1.

7. The second device of claim 1, wherein the $Mt^h$ subframe is different from a subframe occupied by the first device to send a random access channel (RACH) preamble (PRACH).

8. The second device of claim 3, wherein before sending the access signal to the first device at the predetermined moment, the receiver is further configured to receive the access sequence, and wherein the access sequence is configured by the first device or the network side device for the second device.

9. The second device of claim 3, wherein before sending the access signal to the first device at the predetermined moment, the receiver is further configured to receive an access sequence set, wherein the access sequence set is configured by the first device or the network side device for the second device, wherein different access sequences comprised in the access sequence set correspond to different types of data, and wherein the processor is further configured to determine the access sequence from the sequence set according to a type of transmitted data.

10. A first device that accesses a network side device, the first device comprising:
    a transmitter configured to send predetermined moment information to a second device, wherein the predetermined moment information comprises a predetermined moment determined according to a discontinuous reception DRX cycle of the first device; and
    a processor coupled to the transmitter and configured to communicate with the second device according to an access cycle of the second device and at the predetermined moment comprised in the predetermined moment information from the transmitter,
    wherein the first device comprises a device that accesses the network side device directly, and wherein the second device comprises a device that can access the network side device using the first device and cannot access the network side device directly,
    wherein the processor is further configured to communicate with the second device at the predetermined moment in an access cycle of the second device,
    wherein the access cycle comprises N times the DRX cycle, wherein the predetermined moment comprises an M" subframe, wherein the M" subframe comprises an M" subframe before or after a paging subframe in a first DRX cycle, and wherein N>1, wherein M>1, wherein N and M are integers, and wherein the first DRX cycle comprises the first DRX cycle of the N DRX cycles comprised in the access cycle.

11. The first device of claim 10, wherein the processor is further configured to receive, at the predetermined moment, an access signal from the second device.

12. The first device of claim 11, wherein the access signal comprises an access sequence, wherein an access sequence of the second device is orthogonal to an access sequence of a third device, and wherein the third device communicates with the first device in a non-contention manner at a same time when the second device communicates with the first device at the predetermined moment.

13. The first device of claim 10, wherein the processor is further configured to: receive, at the predetermined moment, data from the second device; and send the data to the network side device on behalf of the first device.

14. The first device of claim 10, wherein the transmitter is further configured to send a signal to the second device at the predetermined moment permitting the second device to access the first device, wherein the second device comprises a first radio that only communicates with first device, and wherein the first device comprises a second radio that communicates with both the second device and the network side device.

15. The first device of claim 10, wherein a resource corresponding to the predetermined moment comprises a time domain resource and a frequency domain resource, wherein the time domain resource comprises R symbols comprised in the $M^h$ subframe, wherein R>1, wherein the frequency domain resource comprises S physical resource blocks (PRBs), and wherein S>1.

16. The first device of claim 10, wherein the M" subframe is different from a subframe occupied by the first device to send a random access channel (RACH) preamble (PRACH).

17. The first device of claim 12, wherein the transmitter is further configured to configure and send the access sequence to the second device before receiving, at the predetermined moment, the access signal from the second device.

18. The first device of claim 12, wherein the transmitter is further configured to configure and send an access sequence set to the second device before receiving, at the predetermined moment, the access signal from the second device, and wherein different access sequences comprised in the access sequence set correspond to different types of data.

* * * * *

UNITED STATES PATENT AND TRADEMARK OFFICE
CERTIFICATE OF CORRECTION

PATENT NO. : 10,667,200 B2  
APPLICATION NO. : 15/773515  
DATED : May 26, 2020  
INVENTOR(S) : Da Wang, Jian Wang and Bin Liu Page 1 of 1

It is certified that error appears in the above-identified patent and that said Letters Patent is hereby corrected as shown below:

In the Claims

Claim 1, Column 21, Line 54: "an $M^h$ subframe, wherein the $M^h$ subframe is an $Mt^{h}$" should read "an $M^{th}$ subframe, wherein the $M^{th}$ subframe is an $M^{th}$"

Claim 6, Column 22, Line 20: "in the $M^{"h}$ subframe" should read "in the $M^{th}$ subframe"

Claim 7, Column 22, Line 23: "claim 1, wherein the $Mt^{h}$" should read "claim 1, wherein the $M^{th}$"

Claim 10, Column 22, Line 65 and 66: "an $M$" subframe, wherein the $M$" subframe comprises an $M$"subframe" should read "an $M^{th}$ subframe, wherein the $M^{th}$ subframe comprises an $M^{th}$ subframe"

Claim 10, Column 23, Line 1: "wherein M>1, wherein N and M" should read "wherein $M \geq 1$, wherein N and M"

Claim 15, Column 24, Line 8: "comprised in the $M^h$ subframe, wherein R>1, wherein the" should read "comprised in the $M^{th}$ subframe, wherein $R \geq 1$, wherein"

Claim 15, Column 24, Line 10: "wherein S>1." should read "wherein $S \geq 1$."

Claim 16, Column 24, Line 11: "wherein the $M$" subframe" should read "wherein the $M^{th}$ subframe"

Signed and Sealed this  
Fourteenth Day of July, 2020

Andrei Iancu  
*Director of the United States Patent and Trademark Office*